A. BANHART.
ALARM THERMOMETER.
APPLICATION FILED MAR. 1, 1910.

992,145.  Patented May 16, 1911.

Witnesses
J. S. Freeman
B. P. Fishburn

Inventor
Albert Banhart
By C. L. Parker, Attorney

UNITED STATES PATENT OFFICE.

ALBERT BANHART, OF OBERNDORF-ON-THE-NECKAR, GERMANY, ASSIGNOR TO JULIUS BANHART, OF HUTCHINSON, KANSAS.

ALARM-THERMOMETER.

992,145. Specification of Letters Patent. Patented May 16, 1911.

Application filed March 1, 1910. Serial No. 546,608.

*To all whom it may concern:*

Be it known that I, ALBERT BANHART, a subject of the Emperor of Germany, residing at Oberndorf-on-the-Neckar, Kingdom of Würtemburg, German Empire, have invented certain new and useful Improvements in Alarm-Thermometers, of which the following is a specification.

My invention relates to a device adapted to be employed when heating or boiling fluids or the like, so that an alarm will be given when the liquid reaches a certain degree of temperature.

An important object of my invention is to provide a device of the above character which may be adjusted to operate at different heat temperatures.

A further object of my invention is to provide a device of the above character, which will be simple in construction and not liable to get out of order.

My invention consists generally in the arrangement and combination of parts to be hereinafter described.

Figures 1, 2:
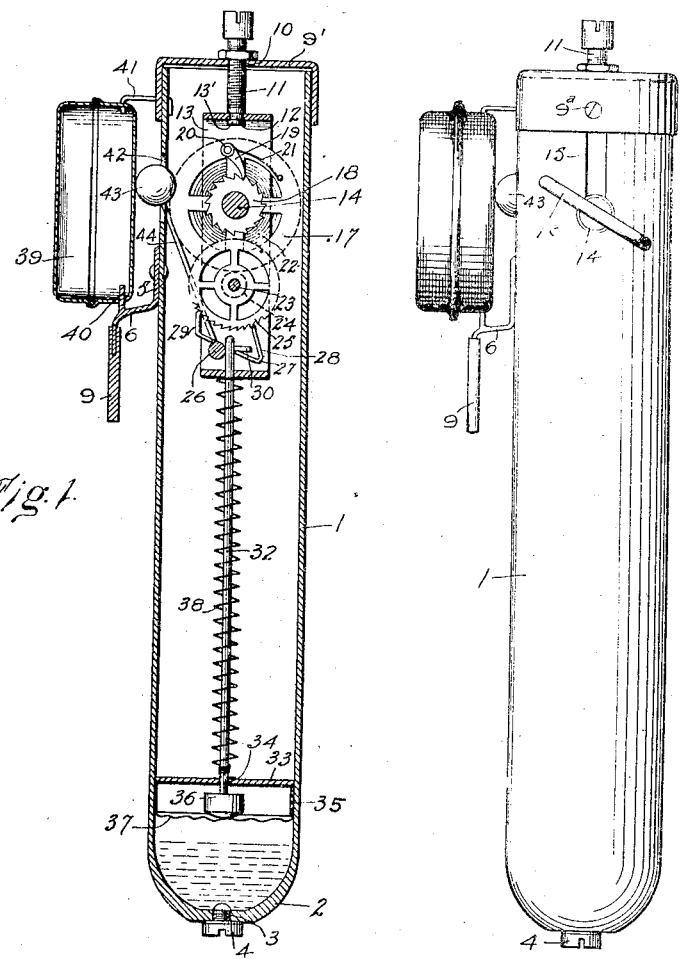
Figure 3:
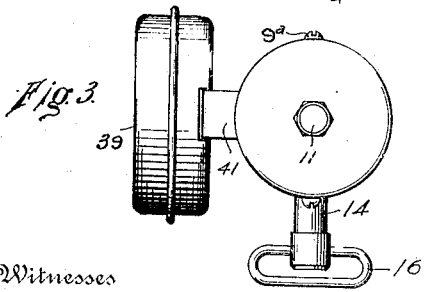
Figure 4:
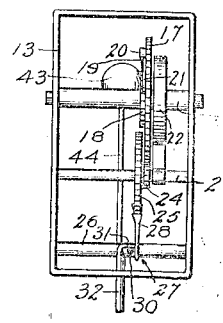

In the accompanying drawings, forming a part of this specification, and in which like numerals are employed to designate like parts throughout the same, Figure 1 is a vertical longitudinal section through the device. Fig. 2 is a side elevation of the device. Fig. 3 is a top plan view of the same. Fig. 4 is a side view of the spring motor removed.

In the drawings illustrating a preferred embodiment of my invention 1 designates a casing, which forms the body portion of the device and which may be preferably cylindrical. The lower end of the casing 1 is closed as at 2, and this closed end 2 is provided with an opening 3, which is normally closed by means of a removable screw 4. The casing 1 has rigidly connected thereto near its upper end as at 5, a bracket 6, which extends downwarly in spaced relation to said casing 1. The bracket 6 is provided with a portion 9, as illustrated.

In the use of the device, the casing 1 is placed within the receptacle, which contains the liquid to be heated, and the lower end of the casing 1 is submerged within said liquid. The bracket 6 together with the portion 9 is arranged upon the edge of the receptacle, and supports the casing 1. The upper end of the casing 1, is formed open, and is closed by means of a cap 9', which is removable from the casing 1, said cap 9' being locked to the casing 1 by means of screws 9ª, or the like.

The cap 9' is provided centrally thereof with a screw-threaded opening 10, for the reception of an adjusting screw 11, the lower end of which is formed plane as at 12, and rotatably mounted within the upper portion of a bracket 13. The lower end of the screw 11 is enlarged as at 13', and this construction prevents said screw 11 from being separated from the bracket 13. From the construction above described, it is obvious that the bracket 13 is suspended from the adjusting screw 11, and that said bracket 13 may be adjusted vertically by rotating the screw 11. The bracket 13 is shown as being substantially rectangular, and said bracket 13 has rotatably mounted therethrough near its center, a shaft 14, which extends laterally beyond said bracket 13 and has its ends disposed within longitudinally arranged slots 15 formed at diametrically opposite points upon the casing 1. One end of the shaft 14 is provided with a handle 16, whereby said shaft may be rotated for a purpose to be hereinafter apparent. Upon the shaft 14, is loosely mounted a pinion 17, upon one side of which is arranged a ratchet-wheel 18, which is rigidly mounted upon the shaft 14. The loose pinion 17 is provided with a pawl 19, pivotally connected thereto as at 20, and disposed to engage the ratchet-wheel 18. The pawl 19 is kept in engagement with the ratchet-wheel 18, by means of a bow-spring 21, mounted upon the loose pinion 17. Upon the other side of the pinion 17, is arranged a coil spring 22, which is wound about the shaft 14 and adapted to rotate the same when unwinding. One end of the coil spring 22 is fixedly secured to the shaft 14 and the opposite end of the same is connected to a shaft 23, which is mounted through the sides of the bracket 13. The shaft 23 is disposed in vertical alinement with shaft 14, and upon said shaft 23, is rotatably mounted a relatively small pinion 24, arranged to mesh with the pinion 17.

An escapement-wheel 25 is rotatably mounted upon the shaft 23, and rigidly connected to the pinion 24. Below the shaft 23 is arranged a shaft 26, which is pivotally mounted upon the bracket 13. Rigidly mounted upon the shaft 26, is an escapement 27 comprising pallets 28 and 29 which alternately engage the teeth of the escapement-wheel 25, and receive thereby a reciprocating motion, which is imparted to the shaft 26. The shaft 26 is provided with a pin 30 fixedly connected thereto and this pin 30 is normally engaged by the upper bent end 31 of a vertically movable rod 32. The upper portion of the rod 32 is slidably mounted through the lower portion of the bracket 13 and the lower portion of the rod 32 passes through a circular plate 33, as at 34. The plate 33 is provided at its periphery with an annular flange 35, the plate 34 together with the flange 35 being immovable. Below the plate 33 the rod 32 has rigidly secured thereto a knob 36, which is disposed above a diaphragm 37 spanning the lower portion of the casing 1 and secured thereto by any suitable means. The space below the diaphragm 37 is partially filled with an alcohol-benzin, which is readily converted into a vapor when subjected to heat. It will thus be seen that when the device is placed within the liquid to be boiled, and properly adjusted, the gasifying of the alcohol-benzin will produce a pressure whereby the diaphragm 37 will be raised, which in turn will raise the rod 32. This movement of rod 32 will release the pin 30 and allow the escapement wheel 25 to rotate. After the device has been removed from the hot liquid and the pressure below the diaphragm accordingly reduced, the hooked end of the rod 32 is returned to its engagement with the pin 30 by means of an expansible coil spring 38, which surrounds the rod 32.

Arranged outside of the casing 1 and near the upper end thereof is a suitable gong 39, which is connected to the bracket 6 by means of the strip 40, and to the cap 8 by means of a strip 41. The casing 1 is provided adjacent the gong 39, with an opening 42, within which operates a striker 43 fixedly secured upon an oscillatory rod 44, which in turn is fixedly mounted upon the shaft 26.

In the operation of my device, a suitable amount of alcohol-benzin is placed within the casing 1 below the diaphragm 37, so that the rods will be raised, when the liquid being heated reaches a certain number of degrees, say 100° centigrade. As the rod 32 is raised by the pressure below the diaphragm 37, the pin 30 is released and the escapement wheel 25 will be rotated by virtue of its connection with the spring 22. The rod 26 will then receive a rotary reciprocatory movement which will be imparted to the rod 44, whereby said rod 44 is oscillated and the striker 43 will intermittently engage the gong 39. After the pressure below the diaphragm 37 falls, the spring 34 will return rod 32 to its normal position and the escapement wheel prevented from turning. If it is desired to have the alarm given before the liquid being heated reaches 100° centigrade, the bracket 13 is lowered by rotating the adjusting screw 11 as above described, and the rod 32 will be removed from upon the pin 30 by a shorter movement than before. It is obvious that the bracket 13 may be raised, whereby the device will not give an alarm until the temperature of the liquid being heated exceeds 100° centigrade. It is to be understood that the spring 22 may be wound up by rotating the shaft 14 clockwise.

Having fully described my invention, I claim.

1. In a device of the character described, a casing, a frame longitudinally movably mounted within said casing, a screw for moving said frame, a spring motor arranged within said frame, comprising a train of gears and an escapement, a striker attached to said escapement, a gong to coöperate with the striker, a movable rod to engage said escapement, a flexible diaphragm suitably mounted within the casing below said rod and adapted to engage the same, and expansible material disposed within said casing below flexible diaphragm.

2. In a device of the character described, a tubular casing, a frame longitudinally movably mounted within said casing, a screw for moving said frame, a spring motor arranged within said frame, comprising a plurality of shafts journaled through said frame, coöperating gears and an escapement connected to said shafts, said casing being provided with longitudinally extending slots, one of said shafts extending beyond the frame to operate within said slots, whereby said frame is guided in its longitudinal movement, a movable rod provided with means to engage said escapement, a flexible diaphragm arranged within said casing to engage said rod, expansible material arranged below said diaphragm to raise the same when subjected to heat, a striker connected to said escapement, and a gong to coöperate with the striker.

3. In a device of the character described, a casing, a frame longitudinally movably mounted within said casing, a screw for moving said frame, a spring motor arranged within said frame, comprising a plurality of shafts journaled through said frame, coöperating gears and an escapement connected to said shafts, said casing being provided with longitudinally extending slots, one of said shafts extending beyond the frame to operate within said slots, whereby said frame is guided in its longitudinal movement, a movable rod provided with means to engage said escapement, a spring to normally hold said rod in its lowermost position, a flexible diaphragm arranged within said casing to engage said rod, expansible material arranged below said diaphragm to raise the same when subjected to heat, a striker connected to said escapement, and a gong to coöperate with the striker.

4. In a device of the character described, a casing, a motor mounted within said casing, means to move said motor longitudinally of said casing, an alarm device to be actuated by the motor, a movable rod to control the action of the motor, a flexible diaphragm mounted within the casing to engage the rod, and expansible material disposed within said casing below said diaphragm.

5. In a device of the character described, a casing, a frame longitudinally movably mounted therein, means to effect the movement of said frame, a motor arranged within the frame, comprising a train of gears and an escapement, a striker attached to said escapement, a gong to coöperate with the striker, a movable rod to engage said escapement, a flexible diaphragm suitably mounted within the casing below said rod and adapted to engage the same, and expansible material disposed below said diaphragm and within said casing.

6. In a device of the character described, a substantially tubular casing adapted to be placed in the liquid to be heated, a motor mounted within said casing, an alarm device to be actuated by said motor and having connection with said casing, a movable rod to control the action of said motor, a flexible diaphragm mounted within said casing to engage the rod, and an expansible liquid disposed within said casing below said diaphragm.

In testimony whereof I affix my signature in presence of two witnesses.

ALBERT BANHART.

Witnesses:
FRIDA KLAIBER,
ERNEST ENTENMANN.